US008832281B2

(12) United States Patent
Dorso (10) Patent No.: US 8,832,281 B2
(45) Date of Patent: Sep. 9, 2014

(54) UTILIZING RESOURCES OF A PEER-TO-PEER COMPUTER ENVIRONMENT

(75) Inventor: Gregory Dorso, San Jose, CA (US)

(73) Assignee: TangoMe, Inc., Mountain View, CA (US)

( * ) Notice: Subject to any disclaimer, the term of this patent is extended or adjusted under 35 U.S.C. 154(b) by 689 days.

(21) Appl. No.: 12/684,350

(22) Filed: Jan. 8, 2010

(65) Prior Publication Data

US 2011/0173333 A1    Jul. 14, 2011

(51) Int. Cl.
*G06F 15/16*    (2006.01)

(52) U.S. Cl.
USPC ............................ 709/228; 709/227; 709/204

(58) Field of Classification Search
CPC .................. H04L 67/1091; H04L 67/2823
USPC ..................... 709/227–228, 225, 230, 204
See application file for complete search history.

(56) References Cited

U.S. PATENT DOCUMENTS

| | | | |
|---|---|---|---|
| 6,286,104 B1 | 9/2001 | Buhle et al. | |
| 6,314,108 B1 | 11/2001 | Ramasubramani et al. | |
| 6,614,774 B1 * | 9/2003 | Wang | 370/338 |
| 6,651,250 B1 | 11/2003 | Takai | |
| 6,690,651 B1 | 2/2004 | Lamarque, III et al. | |
| 7,213,047 B2 | 5/2007 | Yeager et al. | |
| 7,254,608 B2 | 8/2007 | Yeager et al. | |
| 7,386,878 B2 | 6/2008 | Fernando et al. | |
| 7,596,618 B2 | 9/2009 | Basu et al. | |
| 7,689,220 B2 | 3/2010 | Fukushima et al. | |
| 7,707,034 B2 | 4/2010 | Sun et al. | |
| 7,788,378 B2 | 8/2010 | Rao et al. | |
| 7,809,943 B2 | 10/2010 | Seidel | |
| 7,882,248 B2 | 2/2011 | Sano et al. | |
| 8,037,202 B2 | 10/2011 | Yeager et al. | |
| 8,108,455 B2 | 1/2012 | Yeager et al. | |
| 8,489,701 B2 | 7/2013 | Manion et al. | |
| 2002/0062375 A1 | 5/2002 | Teodosiu et al. | |
| 2004/0030749 A1 | 2/2004 | Bowman-Amuah | |
| 2004/0039810 A1 | 2/2004 | Donescu et al. | |
| 2004/0088347 A1 | 5/2004 | Yeager et al. | |
| 2004/0088348 A1 | 5/2004 | Yeager et al. | |

(Continued)

FOREIGN PATENT DOCUMENTS

| | | |
|---|---|---|
| EP | 1229443 | 8/2002 |
| WO | WO-02/42900 | 5/2002 |

(Continued)

OTHER PUBLICATIONS

Eronen, Pasi "Security in the Jini Networking Technology: A Decentralized Trust Management Approach", *Master's Thesis*, Helsinki University of Technology, Department of Computer Science and Engineering, (Mar. 2001),31-33.

(Continued)

*Primary Examiner* — Philip B Tran (57) ABSTRACT

Utilizing resources of a peer-to-peer computer environment. Connections to a peer-to-peer computer environment are established using a first protocol at an open node computer system. A request for services is received at the open node computer system from a user computer system not currently associated with the peer-to-peer computer environment, wherein the request is received using a second protocol. The request for the services is satisfied using resources of the peer-to-peer computer environment.

23 Claims, 4 Drawing Sheets

(56) References Cited

U.S. PATENT DOCUMENTS

| | | |
|---|---|---|
| 2004/0088369 A1 | 5/2004 | Yeager et al. |
| 2004/0133640 A1 | 7/2004 | Yeager et al. |
| 2004/0181689 A1 | 9/2004 | Kiyoto et al. |
| 2005/0238047 A1 | 10/2005 | Holland et al. |
| 2006/0111112 A1 | 5/2006 | Maveddat |
| 2006/0256751 A1 | 11/2006 | Jagadeesan et al. |
| 2007/0028133 A1* | 2/2007 | Izutsu et al. ............... 714/4 |
| 2007/0047516 A1 | 3/2007 | Kottilingal |
| 2007/0074019 A1 | 3/2007 | Seidel |
| 2007/0162605 A1 | 7/2007 | Chalasani et al. |
| 2007/0274210 A1 | 11/2007 | Jang |
| 2008/0126549 A1 | 5/2008 | Khanchandani et al. |
| 2008/0183853 A1 | 7/2008 | Manion et al. |
| 2008/0201484 A1 | 8/2008 | Sano et al. |
| 2008/0281971 A1 | 11/2008 | Leppanen et al. |
| 2009/0023430 A1 | 1/2009 | Levien et al. |
| 2009/0125637 A1* | 5/2009 | Matuszewski ............... 709/238 |
| 2009/0172180 A1 | 7/2009 | Chiu et al. |
| 2009/0177792 A1 | 7/2009 | Guo et al. |
| 2009/0180429 A1 | 7/2009 | Stevens et al. |
| 2009/0313353 A1* | 12/2009 | Lou ............................... 709/219 |
| 2010/0031335 A1 | 2/2010 | Handler |
| 2010/0146092 A1* | 6/2010 | Hu et al. ....................... 709/223 |
| 2010/0146126 A1* | 6/2010 | Lin et al. ....................... 709/228 |
| 2010/0150252 A1 | 6/2010 | Camp, Jr. et al. |
| 2010/0177699 A1 | 7/2010 | Klefter et al. |
| 2010/0246788 A1* | 9/2010 | Menard et al. ................. 379/159 |
| 2010/0299687 A1* | 11/2010 | Bertino-Clarke ............. 709/204 |
| 2011/0087783 A1* | 4/2011 | Annapureddy et al. ....... 709/226 |
| 2011/0087915 A1* | 4/2011 | Zhang et al. .................. 709/219 |
| 2011/0137991 A1* | 6/2011 | Russell ......................... 709/204 |
| 2011/0282945 A1 | 11/2011 | Thyni et al. |

FOREIGN PATENT DOCUMENTS

| | | |
|---|---|---|
| WO | 03/046747 | 6/2003 |
| WO | 2004/063843 | 7/2004 |
| WO | 2007/118250 | 10/2007 |
| WO | 2009/118383 | 10/2009 |
| WO | 2010/002302 | 1/2010 |

OTHER PUBLICATIONS

"Jini Architecture Specification", Sun Microsystems, Inc. Version 1.2, (Dec. 2001),12-22.

Turgunbaev, Rashid , "Co-WEB: A Peer-to-Peer Based, Partially Decentralized Framework for Collaborative Web-content Publishing", First International Conference on Advances in Future Internet, 2009, 6 pages.

Zhang, Meng , "Optimizing the Throughput of Data-Driven Peer-to-Peer Streaming", IEEE Transactions on Parallel and Distributed Systems, col. 20, No. 1, Jan. 2009, 14 pages.

* cited by examiner

FIG. 1

Process
200

Connections to a peer-to-peer computer environment are established using a first protocol at an open node computer system.
202

A request for services is received at the open node computer system from a user computer system not currently associated with the peer-to-peer computer environment, wherein the request is received using a second protocol.
204

The request for the services is satisfied using resources of the peer-to-peer computer environment.
206

A domain name server is updated with a list of open nodes located on the peer-to-peer computer environment.
208

FIG. 2

Process
300

A service is requested over a computer network using a first protocol, wherein the service is requested at a user computer system not currently associated with the peer-to-peer computer environment.
302

An open node computer system located on the peer-to-peer computer environment is accessed in response to the requesting the service by the user computer system.
304

A satisfaction of the request for the service from the open node computer system is received, wherein the open node computer system satisfies the service using resources of the peer-to-peer computer environment.
306

UTILIZING RESOURCES OF A PEER-TO-PEER COMPUTER ENVIRONMENT

BACKGROUND

Computer systems may be networked to other computer systems using a variety of techniques and may be configured to provide services to other computer systems using a variety of techniques. For example, a group of computer system may operate as standard computer servers using a standard network topology to provide services to a client computer system. Such a group of server computer systems is often known as a server farm. In another example, a group of computers systems may be configured in a peer-to-peer computer environment. In such an environment, a computer system typically must join the peer-to-peer computer environment to request services from the peer-to-peer computer environment.

BRIEF DESCRIPTION OF THE DRAWINGS

The drawings referred to in this description of embodiments should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "establishing," "receiving," "satisfying," "requesting," "accessing," "updating," or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Overview of Discussion

Embodiments of the present technology are for utilizing resources of a peer-to-peer computer environment. A typical peer-to-peer computer environment may be composed of peer computer systems, known as nodes, each which have various connective abilities. A user computer system may desire to connect to a peer-to-peer computer environment to exchange data, request services, or otherwise utilize the resources of the peer-to-peer computer environment. In order to do so the user computer system may be required to join the peer-to-peer computer environment by becoming a node in the peer-to-peer computer environment. The present technology allows a user computer system to utilize the resources of the peer-to-peer computer environment without requiring the user computer system to join or become a node in the peer-to-peer computer environment.

A user computer system may use a web browser application to access other computer systems via the Internet. In so doing the user may enter an Internet Protocol (IP) address into the web browser application to access the services or resources of another computer system. The web browser application may receive a domain name from the user and then first contact a domain name system (DNS) server and then be redirected to an actual IP address using binary identifiers. The web browser application may then be used to access a webpage which is hosted by a server farm. In one embodiment of the present technology, the web browser application is directed to a peer-to-peer computer environment hosting a webpage or other services instead of a server farm.

In one embodiment, the present technology comprises a peer-to-peer computer environment with at least one open node. An open node is defined to be a computer system which is a peer or node on the peer-to-peer computer environment and has the ability to be connected to from anywhere on the Internet, including computer systems that are not part of the peer-to-peer computer environment. In one embodiment, the open node acts as a bridge between the user computer system and the peer-to-peer computer environment. By acting as a bridge the open node allows the user computer system to communicate with the open node using one protocol while the open node communicates with the peer-to-peer computer environment using a different protocol. This allows the user computer system to be unaware of the peer-to-peer computer environment while at the same time utilizing the resources of the peer-to-peer computer environment. Another advantage of the present technology allows the user computer system to request and receive services from the peer-to-peer computer environment without being required to download or install any additional software or applications that allow access to the peer-to-peer computer environment.

The following discussion will demonstrate various hardware, software, and firmware components that are used with and in computer systems for utilizing the resources of a peer-to-peer computer environment using various embodiments of the present technology. Furthermore, the systems and methods may include some, all, or none of the hardware, software, and firmware components discussed below.

It should be appreciated that a peer-to-peer computer environment is well known in the art and is also known as a peer-to-peer network and is often abbreviated as P2P. It should be understood that a peer-to-peer computer environment may comprise multiple computer systems, and may include routers and switches, of varying types that communicate with each other using designated protocols. In one embodiment, a peer-to-peer computer environment is a distributed network architecture that is composed of participants that make a portion of their resources (such as processing power, disk storage, and network bandwidth) available directly to their peers without intermediary network hosts or servers. In one embodiment, peer-to-peer technology is used to manage the cluster of nodes.

Embodiments of Utilizing the Resources of a Peer-to-Peer Computer Environment

Figure 1:
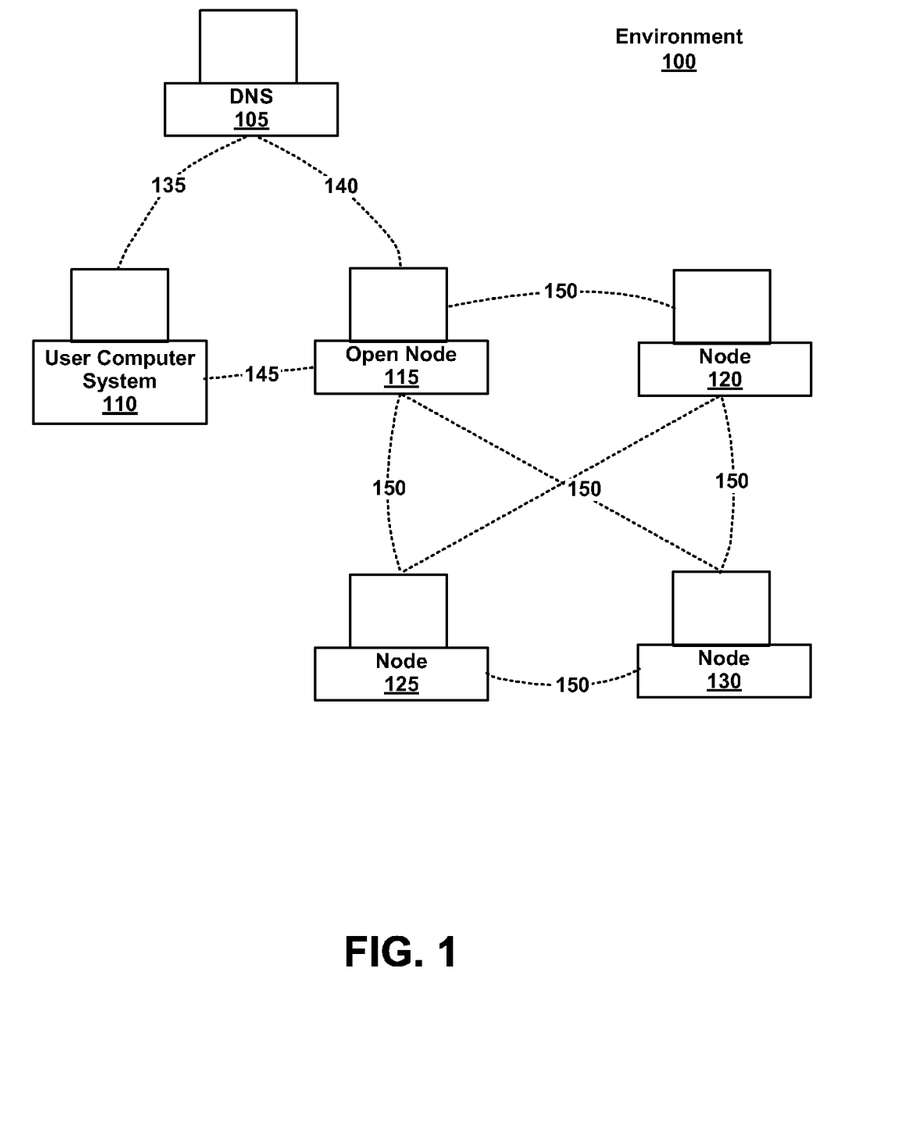
FIG. 1 illustrates a block diagram of an example environment of utilizing the resources of a peer-to-peer computer environment in accordance with embodiments of the present technology.

With reference now to FIG. 1, a block diagram of a user computer system and a peer-to-peer computer environment for use in utilizing the resources of a peer-to-peer computer environment. Environment 100 includes DNS 105, user computer system 110, open node 115, and nodes 120, 125, and 130. Environment 100 comprises components that may or may not be used with different embodiments of the present technology and should not be construed to limit the present technology.

In one embodiment, environment 100 includes user computer system 110. User computer system 110 may be a computer system including a server computer system or a personal computer system. User computer system 110 may be any type of machine capable of computing data and communicating with other similar machines over a network. In one embodiment, user computer system 110 is a virtual computer. User computer system 110 may have a limited number of resources for carrying out services. Such resources may include central processing unit (CPU) usage, memory usage, bandwidth, storage capacity, etc.

In one embodiment, user computer system 110 requests the services of another computer system over a computer network using a first protocol. Such services may include; exchanging data, accessing a database, accessing a webpage, streaming multi media data, etc. For example, the peer-to-peer computer environment can perform content delivery network (CDN) over HTTP duties where the key is the URL of the asset and the value is the actual data. In one embodiment, user computer system 110 may use a web browser application to request such services. In one embodiment, the web browser application first contacts domain name system (DNS) server 105 with a DNS query. DNS 105 then responds to user computer system 110 with a DNS response and redirects user computer system 110 to another computer system such as open node 115. Communication line 135 may be used for both DNS queries and responses. In one embodiment, DNS 105 is a Berkeley Internet Name Domain (BIND) server. It should be appreciated that the first protocol used by user computer system 110 may be, but is not limited to, a hypertext transfer protocol (HTTP) based protocol, a user datagram protocol (UDP) based protocol, a transmission control protocol (TCP) based protocol, session initiation protocol (SIP), etc. In one embodiment, the first protocol is used over communication line 145.

In one embodiment, user computer system 110 accesses open node 115 as demonstrated by communication line 145.

In one embodiment, open node 115 is a computer system that is a node or peer in a peer-to-peer computer environment and may be connected to by other nodes in the peer-to-peer computer environment. In one embodiment, open node 115 is capable of connecting with user computer system 110 using a first protocol and connecting with nodes 120, 125, and 130 using a second protocol. In one embodiment, open node 115 comprises a server component that listens for incoming connections over the first protocol. In this manner, open node 115 acts as a bridge between user computer system 110 and nodes 120, 125, and 130. In one embodiment, open node 115 and nodes 120, 125, and 130 form a peer-to-peer computer environment as shown by communication lines 150. Thus open node 115 acts in a manner similar to a server in a server farm hosting services and receiving request from client computer system while at the same time open node 115 also acts as a node in a peer-to-peer computer environment. User computer system 110 may be unaware that open node 115 and nodes 120, 125, and 130 form a peer-to-peer computer environment. It should be appreciated that environment 100 may include more than one open node in a peer-to-peer computer environment.

In one embodiment, user computer system 110 and nodes 120, 125, and 130 each communicate with each other using a second protocol using communication lines 150. The second protocol may be, but is not limited to peer-to-peer protocols, peer-to-peer gossip protocol, BitTorrent protocol, etc. In one embodiment, the second protocol is a different protocol from the above described first protocol used by both user computer system 110 and open node 115.

In one embodiment, open node 115 communicates with DNS 105 using communication line 140. In one embodiment, such communications include updating DNS 105 with a list of currently available open nodes in the peer-to-peer computer environment. In one embodiment, open node 115 is part of the peer-to-peer computer environment for a limited period of time. Thus if DNS 105 receives a request from user computer system 110 during a period of time in which open node 115 is no longer part of the peer-to-peer computer environment, DNS 105 may redirect user computer system 110 to an open node different from open node 115 using the list of open nodes updated by open node 115 or by any other computer system belonging to the peer-to-peer computer environment. Thus the present technology may provide service to user computer system 110 during the dynamic and churning topology of a peer-to-peer computer environment.

In one embodiment, any node of the peer-to-peer computer environment may update DNS 105 with a list of available open nodes in the peer-to-peer computer environment. In one embodiment, a node in the peer-to-peer computer environment is tasked with updating DNS 105 with a list of available open nodes in the peer-to-peer computer environment. In one embodiment, DNS 105 is configured via zone files to return the IP addresses of the open nodes in the peer-to-peer computer environment that can serve a given protocol. In one embodiment, the name server zones are configured to have a short time to live (TTL) value to prevent intermediate DNS services from caching results for too long.

In one embodiment, nodes 120, 125, and 130 are computer systems which are peers or nodes on the peer-to-peer computer environment. It should be appreciated that nodes 120, 125, and 130 may have a variety of resources and capabilities each different from one another. It should also be appreciated that nodes 120, 125, and 130 may have full networking capabilities including access to the Internet or may have limited networking capabilities. For example, node 130 may only be networked with node 120. In one embodiment, the peer-topeer computer environment is not limited to only nodes 120, 125, and 130, but may have any number of nodes.

In one embodiment, the peer-to-peer computer environment is used as a distributed hash table (DHT) where the second protocol may be OpenDHT or Chord so that the peer-to-peer computer environment can be used to effectively store and retrieve data in a distributed fashion. The storage infrastructure can then be leveraged by both nodes in the peer-to-peer computer environment and user computer systems that are not nodes in the peer-to-peer computer environment to store contact lists, presence information, or other tokens required when building a distributed communication platform.

Operation

Figure 2:
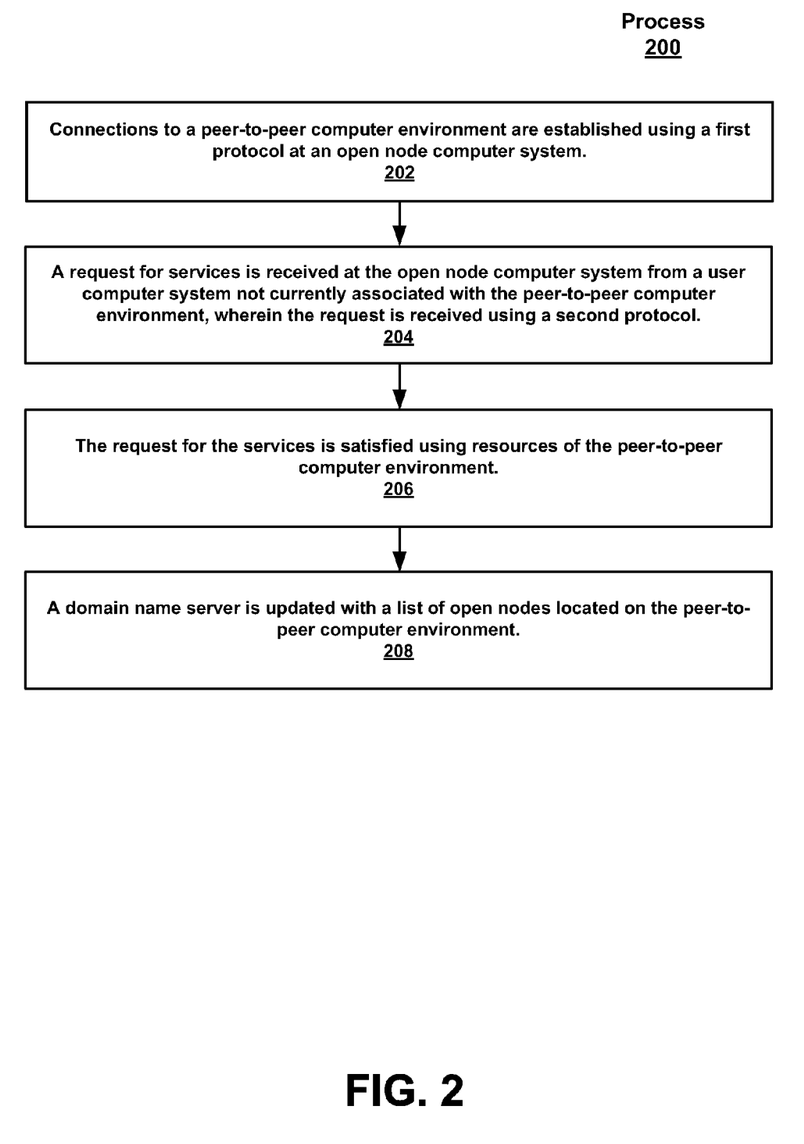
FIG. 2 illustrates a flowchart of an example method for utilizing the resources of a peer-to-peer computer environment in accordance with embodiments of the present technology.

FIG. 2 is a flowchart illustrating process 200 for utilizing resources of a peer-to-peer computer environment, in accordance with one embodiment of the present invention. In one embodiment, process 200 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 200 is performed by open node 115 of FIG. 1. In one embodiment, the methods may reside in a computer usable storage medium having instructions embodied therein that when executed cause a computer system to perform the method.

At 202, connections to a peer-to-peer computer environment are established using a first protocol at an open node computer system. For example, this may be accomplished using open node 115, nodes 120, 125 and 130 and communication lines 150 of FIG. 1. In one embodiment, the first protocol is a peer-to-peer protocol.

At 204, a request for services is received at the open node computer system from a user computer system not currently associated with the peer-to-peer computer environment, wherein the request is received using a second protocol. For example, this may be accomplished using open node 115, user computer system 110 and communication line 145 of FIG. 1. In one embodiment, the second protocol is an HTTP based protocol.

At 206, the request for the services is satisfied using resources of the peer-to-peer computer environment. For example, this may be accomplished using user computer system 110, open node 115, nodes 120, 125 and 130 and communication lines 145 and 150 of FIG. 1.

At 208, a domain name server is updated with a list of open nodes located on the peer-to-peer computer environment. It should be appreciated that step 208 may take place independent of process 200 and may take place parallel to steps 202, 204 and 206. In one embodiment, step 208 reoccurs several times during the operation of the peer-to-peer computer environment. For example, this may be accomplished using open node 115, DNS 105 and communication lines 140 of FIG. 1. In one embodiment, DNS 105 may be updated with a list of open nodes by any peer computer system associated with the peer-to-peer computer environment. By updating a DNS of open nodes that are capable of connecting with a user computer system using a first protocol and are connected with peer computer systems using a second protocol, the DNS is able to redirect incoming domain name requests from the user computer system to the open node without the user computer system being aware that it is connecting with a peer-to-peer computer environment.

Figure 3:
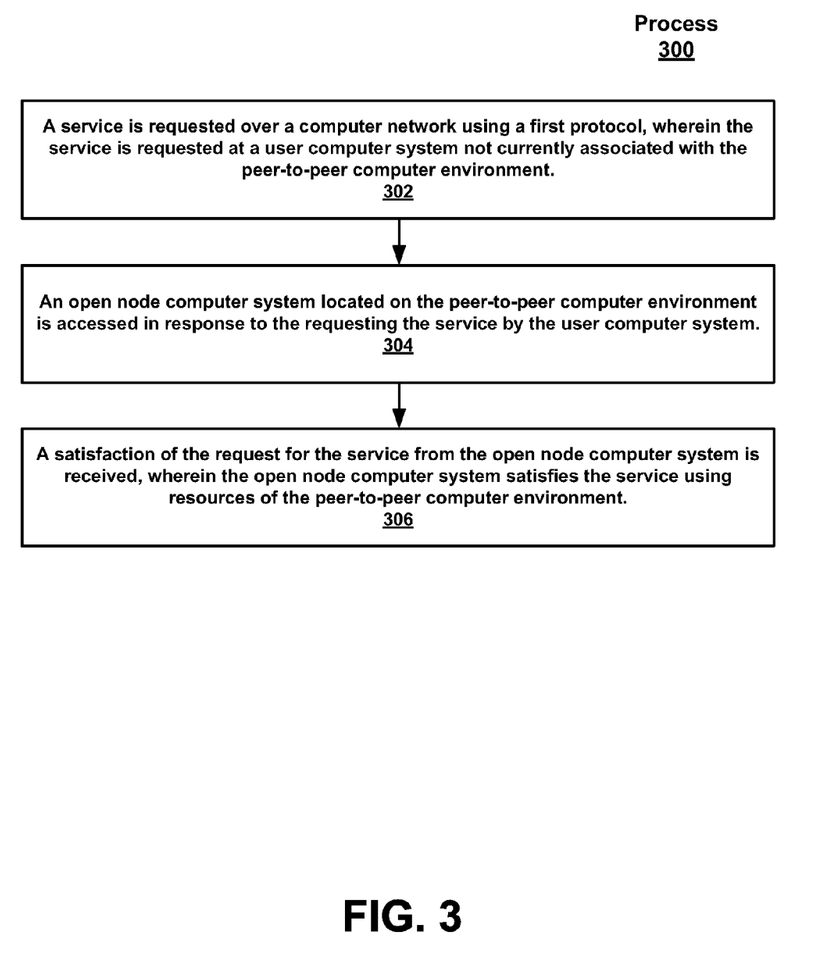
FIG. 3 illustrates a flowchart of an example method for utilizing the resources of a peer-to-peer computer environment in accordance with embodiments of the present technology.

FIG. 3 is a flowchart illustrating process 300 for utilizing resources of a peer-to-peer computer environment, in accordance with one embodiment of the present invention. In one embodiment, process 300 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 300 is performed by user computer system 110 and open node 115 of FIG. 1. In one embodiment, the methods may reside in a computer usable storage medium having instructions embodied therein that when executed cause a computer system to perform the method.

At 302, a service is requested over a computer network using a first protocol, wherein the service is requested at a user computer system not currently associated with the peer-to-peer computer environment. For example, this may be accomplished using user computer system 110 and communication lines 135 and 145 of FIG. 1. In one embodiment, the user computer system first contacts a DNS server such as DNS 105 of FIG. 1. In one embodiment, the first protocol is an HTTP based protocol.

At 304, an open node computer system located on the peer-to-peer computer environment is accessed in response to the requesting the service by the user computer system. In one embodiment, the open node computer system is open node 115 of FIG. 2.

At 306, a satisfaction of the request for the service from the open node computer system is received, wherein the open node computer system satisfies the service using resources of the peer-to-peer computer environment. A timeout system can be put in place such that, if no satisfaction of the request happens within a period of time, the user computer system retries the request again. The DNS Server is configured to avoid returning the same open node again, to increase the likelihood of success for the subsequent request.

Example Computer System Environment

Figure 4:
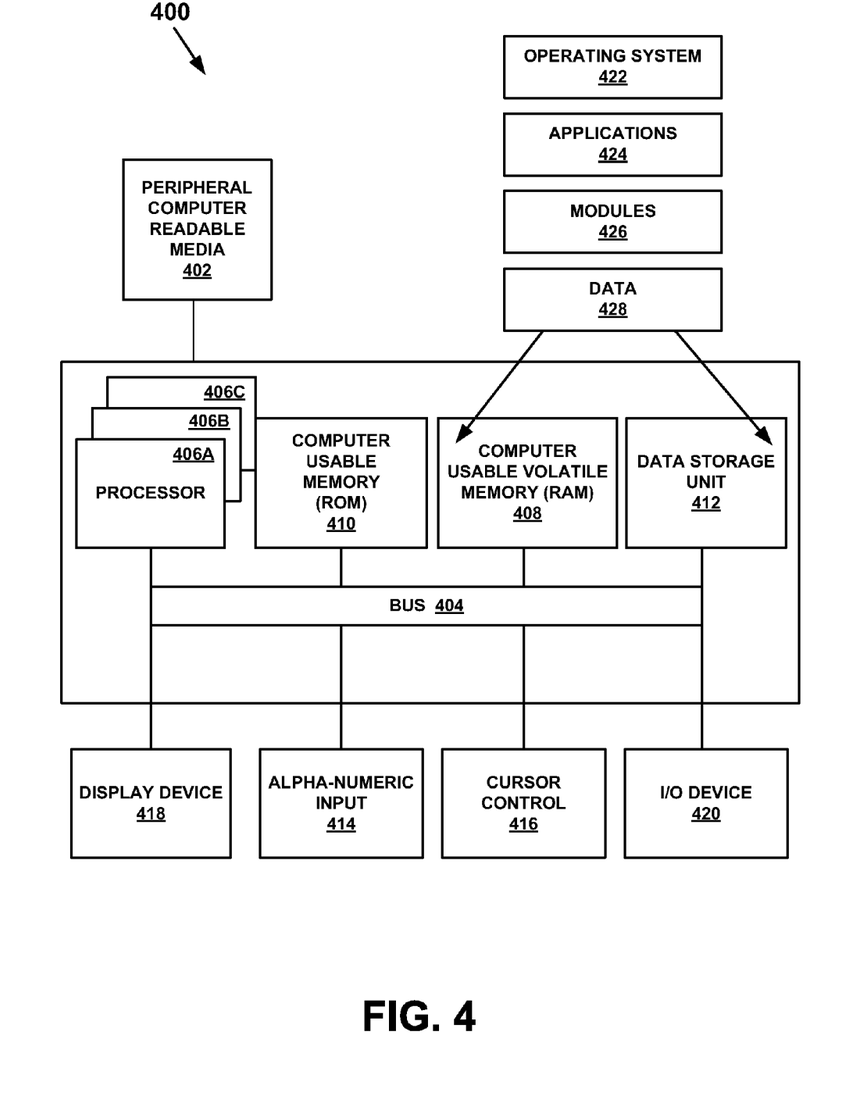
FIG. 4 illustrates a diagram of an example computer system upon which embodiments of the present technology may be implemented.

With reference now to FIG. 4, portions of embodiments of the technology for providing a communication composed of computer-readable and computer-executable instructions that reside, for example, in computer-usable media of a computer system. That is, FIG. 4 illustrates one example of a type of computer that can be used to implement embodiments of the present technology.

FIG. 4 illustrates an example computer system 400 used in accordance with embodiments of the present technology. It is appreciated that system 400 of FIG. 4 is an example only and that embodiments of the present technology can operate on or within a number of different computer systems including general purpose networked computer systems, peer-to-peer networked computer systems, embedded computer systems, routers, switches, server devices, user devices, various intermediate devices/artifacts, stand alone computer systems, mobile phones, personal data assistants, networked TVs, and the like. As shown in FIG. 4, computer system 400 of FIG. 4 is well adapted to having peripheral computer readable media 402 such as, for example, a floppy disk, a compact disc, and the like coupled thereto.

System 400 of FIG. 4 includes an address/data bus 404 for communicating information, and a processor 406A coupled to bus 404 for processing information and instructions. As depicted in FIG. 4, system 400 is also well suited to a multi-processor environment in which a plurality of processors 406A, 406B, and 406C are present. Conversely, system 400 is also well suited to having a single processor such as, for example, processor 406A. Processors 406A, 406B, and 406C may be any of various types of microprocessors. System 400 also includes data storage features such as a computer usable volatile memory 408, e.g. random access memory (RAM), coupled to bus 404 for storing information and instructions for processors 406A, 406B, and 406C.

System 400 also includes computer usable non-volatile memory 410, e.g. read only memory (ROM), coupled to bus 404 for storing static information and instructions for processors 406A, 406B, and 406C. Also present in system 400 is a data storage unit 412 (e.g., a magnetic or optical disk and disk drive) coupled to bus 404 for storing information and instructions. System 400 also includes an optional alpha-numeric input device 414 including alphanumeric and function keys coupled to bus 404 for communicating information and command selections to processor 406A or processors 406A, 406B, and 406C. System 400 also includes an optional cursor control device 416 coupled to bus 404 for communicating user input information and command selections to processor 406A or processors 406A, 406B, and 406C. System 400 of the present embodiment also includes an optional display device 418 coupled to bus 404 for displaying information.

Referring still to FIG. 4, optional display device 418 of FIG. 4 may be a liquid crystal device, cathode ray tube, plasma display device or other display device suitable for creating graphic images and alpha-numeric characters recognizable to a user. Optional cursor control device 416 allows the computer user to dynamically signal the movement of a visible symbol (cursor) on a display screen of display device 418. Many implementations of cursor control device 416 are known in the art including a trackball, mouse, touch pad, joystick or special keys on alpha-numeric input device 414 capable of signaling movement of a given direction or manner of displacement. Alternatively, it will be appreciated that a cursor can be directed and/or activated via input from alpha-numeric input device 414 using special keys and key sequence commands.

System 400 is also well suited to having a cursor directed by other means such as, for example, voice commands. System 400 also includes an I/O device 420 for coupling system 400 with external entities. For example, in one embodiment, I/O device 420 is a modem for enabling wired or wireless communications between system 400 and an external network such as, but not limited to, the Internet. System 400 is also well suited for operation in a cluster of nodes or a peer-to-peer computer environment.

Referring still to FIG. 4, various other components are depicted for system 400. Specifically, when present, an operating system 422, applications 424, modules 426, and data 428 are shown as typically residing in one or some combination of computer usable volatile memory 408, e.g. random access memory (RAM), and data storage unit 412. However, it is appreciated that in some embodiments, operating system 422 may be stored in other locations such as on a network or on a flash drive; and that further, operating system 422 may be accessed from a remote location via, for example, a coupling to the internet. In one embodiment, the present technology, for example, is stored as an application 424 or module 426 in memory locations within RAM 408 and memory areas within data storage unit 412. Embodiments of the present technology may be applied to one or more elements of described system 400.

The computing system 400 is only one example of a suitable computing environment and is not intended to suggest any limitation as to the scope of use or functionality of the present technology. Neither should the computing environment 400 be interpreted as having any dependency or requirement relating to any one or combination of components illustrated in the example computing system 400.

Embodiments of the present technology may be described in the general context of computer-executable instructions, such as program modules, being executed by a computer. Generally, program modules include routines, programs, objects, components, data structures, etc., that perform particular tasks or implement particular abstract data types. Embodiments of the present technology may also be practiced in distributed computing environments where tasks are performed by remote processing devices that are linked through a communications network. In a distributed computing environment, program modules may be located in both local and remote computer-storage media including memory-storage devices.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer implemented method for utilizing resources of a peer-to-peer computer environment, said method comprising:
   establishing connections to a peer-to-peer computer environment using a first protocol at an open node computer system;
   receiving a request for services at said open node computer system from a user computer system not currently associated with said peer-to-peer computer environment, wherein said request is received using a second protocol wherein said user computer system generates said request using said second protocol via a web browser application without requiring said user computer system to install additional software; and
   satisfying said request for said services using resources of said peer-to-peer computer environment without requiring said user computer system to become a node in said peer-to-peer computer environment.

2. The computer implemented method as recited in claim 1 wherein said first protocol is a peer-to-peer protocol.

3. The computer implemented method as recited in claim 2 wherein said peer-to-peer protocol is a gossip protocol.

4. The computer implemented method as recited in claim 1 wherein said first protocol is a bit torrent protocol.

5. The computer implemented method as recited in claim 1 wherein said second protocol is a user datagram protocol (UDP) based protocol.

6. The computer implemented method as recited in claim 1 wherein said second protocol is a transmission control protocol (TCP) based protocol.

7. The computer implemented method as recited in claim 1 wherein said second protocol is a hypertext transfer protocol (HTTP) based protocol.

8. A computer implemented method for utilizing resources of a peer-to-peer computer environment, said method comprising:

updating a domain name server with a list of open nodes located on a peer-to-peer computer environment using a computer system associated with said peer-to-peer computer environment, wherein said open nodes are capable of connecting with a user computer system using a first protocol and connecting with peer computer systems associated with said peer-to-peer computer environment using a second protocol, without requiring said user computer system to become a node in said peer-to-peer computer environment, wherein said user computer system connects with said open nodes using said first protocol via a web browser application without requiring said user computer system to install additional software.

9. A computer-usable storage memory having instructions embodied therein for causing a computer system to perform the steps of utilizing resources of a peer-to-peer computer environment:

establishing connections to a peer-to-peer computer environment using a first protocol at an open node computer system;

receiving a request for services at said open node computer system from a user computer system not currently associated with said peer-to-peer computer environment, wherein said request is received using a second protocol wherein said user computer system generates said request using said second protocol via a web browser application without requiring said user computer system to install additional software; and satisfying said request for said services using resources of said peer-to-peer computer environment without requiring said user computer system to become a node in said peer-to-peer computer environment.

10. The computer-usable storage memory of claim 9 wherein said first protocol is a peer-to-peer protocol.

11. The computer-usable storage memory of claim 10 wherein said peer-to-peer protocol is a gossip protocol.

12. The computer-usable storage memory of claim 9 wherein said first protocol is a bit torrent protocol.

13. The computer-usable storage memory of claim 9 wherein said second protocol is a user datagram protocol (UDP) based protocol.

14. The computer-usable storage memory of claim 9 wherein said second protocol is a transmission control protocol (TCP) based protocol.

15. The computer-usable storage memory of claim 9 wherein said second protocol is a hypertext transfer protocol (HTTP) based protocol.

16. A computer-usable storage memory having instructions embodied therein for causing a computer system to perform the steps of utilizing resources of a peer-to-peer computer environment:

updating a domain name server with a list of open nodes located on a peer-to-peer computer environment using a computer system associated with said peer-to-peer computer environment, wherein said open nodes are capable of connecting with a user computer system using a first protocol and connecting with peer computer systems associated with said peer-to-peer computer environment using a second protocol, without requiring said user computer system to become a node in said peer-to-peer computer environment, wherein said user computer system connects with said open nodes using said first protocol via a web browser application without requiring said user computer system to install additional software.

17. A computer implemented method for utilizing resources of a peer-to-peer computer environment, said method comprising:

requesting a service over a computer network using a first protocol, wherein said service is requested at a user computer system not currently associated with said peer-to-peer computer environment wherein said user computer system performs said requesting using said first protocol via a web browser application without requiring said user computer system to install additional software;

accessing an open node computer system located on said peer-to-peer computer environment in response to said requesting said service by said user computer system; and receiving a satisfaction of said request for said service from said open node computer system, wherein said open node computer system satisfies said service using resources of said peer-to-peer computer environment without requiring said user computer system to become a node in said peer-to-peer computer environment.

18. The computer implemented method as recited in claim 17 wherein said requesting said service first contacts a domain name server.

19. The computer implemented method as recited in claim 17 wherein said first protocol is not a peer-to-peer protocol.

20. The computer implemented method as recited in claim 17 wherein said peer-to-peer computer environment communicates, allocates resources, provides services using a peer-to-peer protocol.

21. The computer implemented method as recited in claim 17 wherein said first protocol is a user datagram protocol (UDP) based protocol.

22. The computer implemented method as recited in claim 17 wherein said second protocol is a transmission control protocol (TCP) based protocol.

23. The computer implemented method as recited in claim 17 wherein said first protocol is a hypertext transfer protocol (HTTP) based protocol.

* * * * *